US007316008B1

(12) United States Patent
Dutta

(10) Patent No.: US 7,316,008 B1
(45) Date of Patent: Jan. 1, 2008

(54) METHOD AND SYSTEM FOR EXTRACTING BUSINESS LOGIC FROM COMPUTER CODE

(75) Inventor: Pijush Dutta, Omaha, NE (US)

(73) Assignee: First Data Corporation, Englewood, CA (US)

( * ) Notice: Subject to any disclaimer, the term of this patent is extended or adjusted under 35 U.S.C. 154(b) by 614 days.

(21) Appl. No.: 10/699,566

(22) Filed: Oct. 31, 2003

Related U.S. Application Data

(60) Provisional application No. 60/422,962, filed on Oct. 31, 2002.

(51) Int. Cl.
*G06F 9/45* (2006.01)
(52) U.S. Cl. ...................................... 717/136
(58) Field of Classification Search ................ 717/100, 717/117, 136, 143
See application file for complete search history.

(56) References Cited

U.S. PATENT DOCUMENTS

| 5,742,827 | A | * | 4/1998 | Ohkubo et al. | 717/143 |
| 5,960,200 | A | * | 9/1999 | Eager et al. | 717/147 |
| 6,199,068 | B1 | * | 3/2001 | Carpenter | 707/100 |
| 6,798,912 | B2 | * | 9/2004 | Devara | 382/229 |
| 2003/0172367 | A1 | * | 9/2003 | Kannenberg | 717/101 |
| 2003/0225811 | A1 | * | 12/2003 | Ali et al. | 709/101 |

OTHER PUBLICATIONS

Coyle, Frank P.; "Legacy Integration-Changing Perspectives", p. 37-41, Mar./Apr. 2000 IEEE, retrieved Oct. 2, 2006.*
Fantechi, A; Nesi, P; Somma, E:"Object-Oriented Analysis of COBOL", p. 157-164, 1997 IEEE, retrieved Oct. 2, 2006.*
Pooch, Udo W.; "Translation of Decision Tables", Computing Surveys, vol. 6, No. 2, Jun. 1974, retrieved from google.com search Oct. 2, 2006.*
Press, Laurence I.; "Conversion of Decision Tables to Computer Programs", p. 385-390, Jun. 1965 ACM, retrieved Oct. 2, 2006.*

* cited by examiner

*Primary Examiner*—Mary Steelman
(74) *Attorney, Agent, or Firm*—Townsend and Townsend and Crew LLP

(57) ABSTRACT

A method for extracting business logic from computer code is disclosed. The computer code has a number of statements. According to the method, the statements are examine to identify a number of conditional statements and a number of action statements. The conditional statements and the action statements are then tagged, with the conditional and action statements each having its associated tag. The conditional statements and the action statements are then respectively grouped together. Next, a number of action sets are generated based on the conditional statements. Each action set includes an associated set of action statements. For each action set, the associated set of action statements are identified from the grouped action statements.

5 Claims, 1 Drawing Sheet

METHOD AND SYSTEM FOR EXTRACTING BUSINESS LOGIC FROM COMPUTER CODE

CROSS-REFERENCES TO RELATED APPLICATIONS

The present application claims the benefit of priority under 35 U.S.C. § 119 from U.S. Provisional Patent Application Ser. No. 60/422,962, entitled "METHOD AND SYSTEM FOR EXTRACTING BUSINESS LOGIC FROM COMPUTER CODE" filed on Oct. 31, 2002, the disclosure of which is hereby incorporated by reference in its entirety for all purposes.

BACKGROUND OF THE INVENTION

The present invention generally relates to computer code, and more specifically, to extraction of business logic from computer code.

A large number of legacy systems are still in existence today. COBOL is one of the more popular computer programming languages that was used for writing computer programs in legacy systems. Much of the computer code written for a legacy system, however, is embedded and typically not available to other external systems.

Various emerging technologies have been developed that allow computer systems to be more compatible. Consequently, more and more computer systems are being developed using such technologies. That, in turn, means that many legacy systems are being replaced with systems that utilize more advanced technologies to allow for more flexibility. Typically, much efforts were expended in developing a legacy system. Therefore, it would be a waste of resources and investment if a new system is unable to use at least some of the logic or functionality of a legacy system, requiring the new system to be built from the bottom up.

Hence, it would be desirable to provide methods and systems that can be used to extract logic or functionality out of computer code in a legacy system.

BRIEF SUMMARY OF THE INVENTION

A method for extracting business logic from computer code is disclosed. The computer code has a number of statements. According to the method, the statements are examine to identify a number of conditional statements and a number of action statements. The conditional statements and the action statements are then tagged, with the conditional and action statements each having its associated tag. The conditional statements and the action statements are then respectively grouped together. Next, a number of action sets are generated based on the conditional statements. Each action set includes an associated set of action statements. For each action set, the associated set of action statements are identified from the grouped action statements.

Each conditional statement is uniquely identified by its associated tag. Each action statement is linked to one or more corresponding conditional statements. The associated tag for each action statement includes information relating to the conditional statement to which the action statement is directly linked, status information indicating a condition relating to the directly linked conditional statement under which the action statement is executed, and information relating to all linked conditional statements representing conditions under which the action statement is executed.

Reference to the remaining portions of the specification, including the drawings and claims, will realize other features and advantages of the present invention. Further features and advantages of the present invention, as well as the structure and operation of various embodiments of the present invention, are described in detail below with respect to accompanying drawings, like reference numbers indicate identical or functionally similar elements.

DETAILED DESCRIPTION OF THE INVENTION

Figure 1:
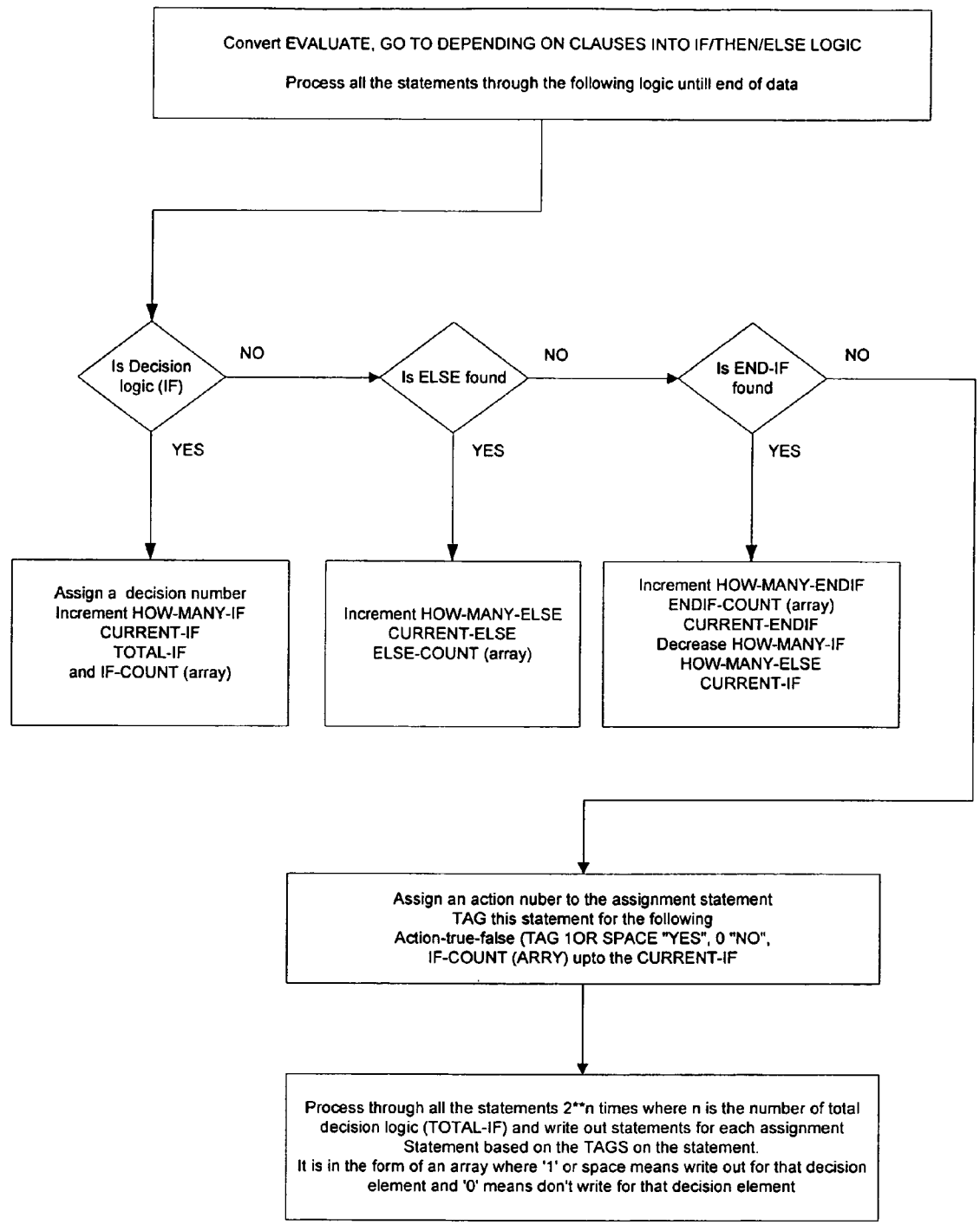
FIG. 1 is a flow diagram illustrating one exemplary method of the present invention.

The present invention in one or more exemplary embodiments will now be described. FIG. 1 is a flow diagram illustrating one exemplary method of the present invention. In one application, an exemplary method of the present invention is used to extract business logic from computer code written in COBOL. However, it should be understood that the present invention can be used to extract business logic from computer code written in any computer programming language. Based on the disclosure and teachings provided herein, a person of ordinary skill in the art will know of other ways and/or methods to apply the present invention. The exemplary method comprises a series of steps to be taken to extract the logic from COBOL code, each of the steps will be further explained below.

First, all the statements in the code are read one by one and examined to identify all the conditional or decision statements and action statements. These identified statements are each assigned a tag. The use of the tag will be further explained below. Each statement is examined to determine whether such statement qualifies as a conditional or decision statement, i.e., whether the statement evaluates a condition and provides for alternative actions depending on the evaluation. In COBOL, such statements include, for example, an 'IF' statement, an 'EVALUATE' statement, etc. Other computer languages have similar conditional statements. Once a conditional statement is identified, that statement is tagged using a tag or identifier, such as, in the example illustrated below, 'DECN####', which uniquely identifies a conditional or decision statement. '####' represents a number. The number is an output of a decision counter which is used to keep track of the order and number of conditional statements within the code. For example, the first conditional statement will have '0001', the second one will have '0002' and so on. Consequently, each identified conditional statement within the code is uniquely identified by its tag.

The next statement is then read and examined to determine if it is another conditional statement. If it is, the next statement is also tagged using the tag 'DECN####'. If the next statement is any of the branching rules, such as, 'NEXT SENTENCE', 'CONTINUE', 'ELSE', 'END-IF', then one of the appropriate conditions, such as, 'TRUE' ('1'), 'FALSE' ('0') or end of the conditional statement is set; at this point the counters will be set appropriately for 'IF', 'ELSE', 'END-IF'. Otherwise, the statement is tagged as an action statement with the tag 'ACTN####', which uniquely identifies an action statement such as, assignment, computation statements, etc. '####' represents a number. This number represents the number assigned to the conditional statement with which this action statement is associated. In other words, an action statement is linked to a corresponding conditional statement.

The tag 'ACTN####' is followed by a number (total count of conditional statements found prior to this statement) of '1', '0' or ' ' depending on the branching parameter ('TRUE', 'FALSE', or TRUE/FALSE). A 'TRUE' ('1') is assigned when the condition must be true to execute the statement and a 'FALSE' ('0') is assigned when the condition must be false to execute the statement. If the statement is independent of the condition, i.e., without regard to whether the condition is 'TRUE' or 'FALSE', then a blank (' ') is assigned.

the entire code is broken down in terms of business logic containing the decision evaluations and corresponding sets of actions taken.

The exemplary method is further illustrated with the following example. In this example, the following COBOL code is broken into decisions and actions. COBOL source code:

```
CANCEL-FOR-NORTH-CAROLINE SECTION.
    IF CHD-CURRENT-BALANCE <= 0
        MOVE 'A'           TO XXX-ACTN-DYNM-1-TEXT-ID
        IF RHF-CNCL-ON-FULL-PAYMENT = 'Y'
            MOVE 'B'       TO XXX-ACTN-DYNM-2-TEXT-ID
        ELSE
            MOVE 'C'       TO XXX-ACTN-DYNM-3-TEXT-ID
        END-IF
        MOVE 'D'           TO XXX-ACTN-DYNM-4-TEXT-ID
    END-IF.
```

First, the code is broken down into decisions and actions as described above. Results of the first step are as follows:

| (1) | IF CHD-CURRENT-BALANCE <= 0 | | DECN0001 | |
|---|---|---|---|---|
| (2) | MOVE 'A' | TO XXX-ACTN-DYNM-1-TEXT-ID | ACTN0001TRUE | 1 |
| (3) | IF RHF-CNCL-ON-FULL-PAYMENT = 'Y' | | DECN0002 | |
| (4) | MOVE 'B' | TO XXX-ACTN-DYNM-2-TEXT-ID | ACTN0002TRUE | 11 |
| (5) | MOVE 'C' | TO XXX-ACTN-DYNM-3-TEXT-ID | ACTN0002FALSE | 10 |
| (6) | MOVE 'D' | TO XXX-ACTN-DYNM-4-TEXT-ID | ACTN0001TRUE | 1 |

Next, after all the conditional and actions statement have been identified, they are then grouped together into their respective categories, i.e., the conditional statement category and the action statement category.

Then, binary numbers are used to represent true ('1') and false ('0') conditions. It should be understood based on the disclosure and teachings provided herein, a person of ordinary skill in the art will appreciate other methods that may be used to represent such conditions. All the possible number of conditions are established and assigned one action set number (a set of actions to be performed if that condition is satisfied). If there are two (2) conditional statements in the code, then the number of possible conditions is four (4) ($2^2$) and the possible conditions are respectively represented by '11', '10', '01' and '00'. There are four (4) action sets. Similarly, if there are three (3) conditional statements in the code, then the number of possible conditions is eight (8) ($2^3$) and the possible conditions are respectively represented by '111', '110', '101', '100', '011', '010', '001' and '000'. There are then eight (8) action sets.

Next, all the possible action sets are created. In this step, all the action statements are processed multiple times (depending on the total number of action sets). The tags on each action statement are matched against the conditional statement tag and all the action sets are filled with the action statements. A blank (' ') in the action statement tag meets both conditions ('1' and '0') on the decision side. As a result, The results are further explained as follows. There are two (2) conditional statements marked with 'DECN0001' and 'DECN0002' and four (4) actions statements. The second statement ('MOVE 'A' TO XXX-ACTN-DYNM-1-TEXT-ID') is an action statement with tag 'ACTN0001TRUE1'. Since the first conditional statement must be true in order to execute this action statement, tag '1' is assigned to this statement.

The fourth statement ('MOVE 'B' TO XXX-ACTN-DYNM-2-TEXT-ID') is an action statement with tag 'ACTN0002TRUE 11'. Since the first and second conditional statements must be true in order to execute this statement, tag '11' is used to represent it.

The fifth statement ('MOVE 'C' TO XXX-ACTN-DYNM-3-TEXT-ID') is an action statement with tag 'ACTN0002FALSE10'. Since the first conditional statement must be true and the second conditional statement must be false in order to execute this statement, tag '10' is used to represent it.

The sixth statement ('MOVE 'D' TO XXX-ACTN-DYNM-4-TEXT-ID') is an action statement with tag 'ACTN0001TRUE 1'. Since the first conditional statement must be true and second conditional statement could be either true or false in order to execute this statement, tag '1' (1 and blank) is used to represent it.

Next, the results from the first step is rearranged further into groups of conditional statements (decisions) and action statements (assignment, computational statements) as follows:

| (DECISION ELEMENTS) | | |
|---|---|---|
| IF CHD-CURRENT-BALANCE <= 0 | | DECN0001 |
| IF RHF-CNCL-ON-FULL-PAYMENT = 'Y' | | DECN0002 |
| (ACTION SETS) | | |
| MOVE 'A' | TO XXX-ACTN-DYNM-1-TEXT-ID | ACTN0001TRUE 1 |
| MOVE 'D' | TO XXX-ACTN-DYNM-4-TEXT-ID | ACTN0001TRUE 1 |
| MOVE 'B' | TO XXX-ACTN-DYNM-2-TEXT-ID | ACTN0002TRUE 11 |
| MOVE 'C' | TO XXX-ACTN-DYNM-3-TEXT-ID | ACTN0002FALSE 10 |

As shown above, there are two (2) conditional statements and four (4) action statements. The conditional statements (decisions) and action statements are grouped separately.

Then, action sets are created for all possible decisions (using, for example, a binary algorithm). The results are as follows:

| (DECISION ELEMENTS) | | |
|---|---|---|
| IF CHD-CURRENT-BALANCE <= 0 | | DECN0001 |
| IF RHF-CNCL-ON-FULL-PAYMENT = 'Y' | | DECN0002 |
| CONDITION NUMBER = 11 POINTS TO ACTION ACTN0000000004 | | |
| CONDITION NUMBER = 10 POINTS TO ACTION ACTN0000000003 | | |
| CONDITION NUMBER = 01 POINTS TO ACTION ACTN0000000002 | | |
| CONDITION NUMBER = 00 POINTS TO ACTION ACTN0000000001 | | |
| LIST OF ACTIONS FOR THE RULE | | |
| ACTION NUMBER = 11 ACTION SET | ACTN0000000004 | |
| MOVE 'A' | TO XXX-ACTN-DYNM-1-TEXT-ID | ACTN0001TRUE 1 |
| MOVE 'B' | TO XXX-ACTN-DYNM-2-TEXT-ID | ACTN0002TRUE 11 |
| MOVE 'D' | TO XXX-ACTN-DYNM-4-TEXT-ID | ACTN0001TRUE 1 |
| ACTION NUMBER = 10 ACTION SET | ACTN0000000003 | |
| MOVE 'A' | TO XXX-ACTN-DYNM-1-TEXT-ID | ACTN0001TRUE 1 |
| MOVE 'C' | TO XXX-ACTN-DYNM-3-TEXT-ID | ACTN0002FALSE 10\* |
| MOVE 'D' | TO XXX-ACTN-DYNM-4-TEXT-ID | ACTN0001TRUE 1 |
| ACTION NUMBER = 01 ACTION SET | ACTN0000000002 | |
| ACTION NUMBER = 00 ACTION SET | ACTN0000000001 | |

\*'1' in bold signifies true condition for the 1st decision and '0' in bold signifies false condition for the 2nd decision.

There are two (2) conditional statements (decisions) in the code:

| | |
|---|---|
| IF CHD-CURRENT-BALANCE <= 0 | DECN0001 |
| IF RHF-CNCL-ON-FULL-PAYMENT = 'Y' | DECN0002 |

For these two (2) conditional statements, there could be four (4) ($2^2$) possible combinations of path for execution of this code. In other words, depending on the conditions, there would be four (4) sets of actions to be performed. Each action set is explained below along with the execution conditions.

CONDITION NUMBER=11 (Means Decision 1 is true and Decision 2 is also true)

If the above conditions are satisfied, then Action Set 'ACTN0000000004' is executed and this action set has the following three (3) action statements:

| | |
|---|---|
| MOVE 'A' | TO XXX-ACTN-DYNM-1-TEXT-ID |
| MOVE 'B' | TO XXX-ACTN-DYNM-2-TEXT-ID |
| MOVE 'D' | TO XXX-ACTN-DYNM-4-TEXT-ID |

CONDITION NUMBER=10 (Means Decision 1 is true and Decision 2 is false)

If the above conditions are satisfied, then Action Set 'ACTN0000000003' is executed and this action set has the following three (3) action statements:

| | |
|---|---|
| MOVE 'A' | TO XXX-ACTN-DYNM-1-TEXT-ID |
| MOVE 'C' | TO XXX-ACTN-DYNM-3-TEXT-ID |
| MOVE 'D' | TO XXX-ACTN-DYNM-4-TEXT-ID |

CONDITION NUMBER=01 (Means Decision 1 is false and Decision 2 is true)

If the above conditions are satisfied, then Action Set 'ACTN0000000002' is executed and this action set does not have any action statements.

CONDITION NUMBER=00 (Means Decision 1 is false and Decision 2 is also false)

If the above conditions are satisfied, then Action Set 'ACTN0000000001' is executed and this action set also does not have any action statements.

Then, using the action statements that have been previously grouped, actions statements belonging to each action set are identified. As a result, each decision evaluation and its corresponding set(s) of actions and actions statements, if any, are identified. Such results represent business logic which can then be used in the implementation of a new code in another computer language.

In an exemplary implementation, the present invention is implemented using software in the form of control logic, in either an integrated or a modular manner. Alternatively, hardware or a combination of software and hardware can also be used to implement the present invention. Based on the disclosure and teachings provided herein, a person of ordinary skill in the art will know of other ways and/or methods to implement the present invention.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference for all purposes in their entirety.

What is claimed is:

1. A method for extracting business logic from a first computer source code written in a first programming language and having a plurality of statements, the method comprising:

examining the plurality of statements to identify a plurality of conditional statements and a plurality of action statements in the first computer source code wherein each conditional statement is associated with at least one action statement;

tagging the plurality of conditional statements and the plurality of action statements, wherein each conditional statement has an associated tag uniquely identifying the conditional statement and each action statement has an associated tag identifying the action statement and linking the action statement to the associated conditional statement;

grouping the plurality of conditional statements into a conditional statement category and the plurality of action statements into an action statement category;

generating a plurality of action sets based on the plurality of conditional statements in the conditional statement category, wherein each of the plurality of action sets includes an associated set of action statements from the action statement category; and generating a second computer source code based on each action set and the associated set of action statements wherein the second computer source code is written in a second programming language and wherein the second programming language is different from the first programming language.

2. The method of claim 1 wherein the first programming language is COBOL.

3. The method of claim 1
   wherein the associated tag for each action statement includes status information indicating a condition relating to the linked conditional statement under which the action statement is executed, and information relating to all linked conditional statements representing conditions under which the action statement is executed.

4. A method for extracting business logic from a first computer source code having a plurality of statements, the method comprising:

examining the plurality of statements to identify a plurality of conditional statements and a plurality of action statements in the first computer source code wherein each conditional statement is associated with at least one action statement;

tagging the plurality of conditional statements and the plurality of action statements, wherein each conditional statement has an associated tag uniquely identifying the conditional statement and each action statement has an associated tag identifying the action statement and linking the action statement to the associated conditional statement;

grouping the plurality of conditional statements into a conditional statement category and the plurality of action statements into an action statement category; and generating a plurality of action sets based on the plurality of conditional statements in the conditional statement category, wherein each of the plurality of action sets includes an associated set of action statements from the action statement category; and loading a database with each action set and the associated set of action statements.

5. The method of claim 4
   wherein the associated tag for each action statement includes status information indicating a condition relating to the linked conditional statement under which the action statement is executed, and information relating to all linked conditional statements representing conditions under which the action statement is executed.

* * * * *